United States Patent [19]
Fujiwara et al.

[11] 4,450,494
[45] May 22, 1984

[54] MAGNETIC HEAD

[75] Inventors: Hideo Fujiwara, Tokorozawa; Mitsuhiro Kudo, Tokyo; Teizo Tamura, Katsuta; Nobuyuki Sugishita, Yokosuka; Yoshihiro Shiroishi; Takeshi Kimura, both of Higashimurayama; Kiminari Shinagawa, Kanagawa; Noriyuki Kumasaka, Ome, all of Japan

[73] Assignee: Hitachi Ltd., Tokyo, Japan

[21] Appl. No.: 304,612

[22] Filed: Sep. 22, 1981

[30] Foreign Application Priority Data

Sep. 22, 1980 [JP] Japan .................. 55-130734

[51] Int. Cl.³ .................... G11B 5/12; G11B 5/22
[52] U.S. Cl. ........................ 360/125; 360/127
[58] Field of Search .............. 360/125, 119-122, 360/126-127

[56] References Cited

U.S. PATENT DOCUMENTS 3,810,245  5/1974  Ozawa et al. .................. 360/127
4,245,269  1/1981  Yasinavichjus et al. ........ 360/125
4,246,619  1/1981  Hirai et al. .................... 360/125

Primary Examiner—Stuart N. Hecker
Attorney, Agent, or Firm—Antonelli, Terry & Wands

[57] ABSTRACT

A magnetic head having a magnetic core formed by facing a pair of magnetic substances through a working gap at a head section confronting a magnetic recording medium is disclosed in which at least one of the magnetic substances has magnetic anisotropy, and an angle $\alpha$ (in a C-shaped core half) and/or an angle $\alpha'$ (in an I-shaped core half) between a core surface confronting the magnetic recording medium and a direction having a maximum magnetic permeability in a main magnetic circuit plane of the magnetic substance having magnetic anisotropy is made larger than an orientation angle of the above direction for making minimum the magnetic reluctance of the main magnetic circuit of the magnetic core by $\beta$ (for $\alpha$) and/or $\beta'$ (for $\alpha'$) to improve the recording/reproducing characteristic of the magnetic head, where $\beta$ is given by a formula $$\left(\frac{20D}{L^*} - 10\right)^\circ < \beta < \min\left[\left(\frac{30D}{L^*} + 20\right)^\circ, 50^\circ\right], \beta'$$

is equal to or less than 25°, D indicates a depth of the working gap, L* indicates an effective length of an oblique part for forming the working gap, and min [a, b] indicates the smaller of a and b.

28 Claims, 36 Drawing Figures

MAGNETIC HEAD

BACKGROUND OF THE INVENTION

The present invention relates to a magnetic recording write and/or read head, and more particularly to a magnetic head including a magnetic core in which two magnetic substances face each other through a working gap at a head section confronting a magnetic recording medium and at least one of the magnetic substances has magnetic anisotropy.

Today, a highly-developed magnetic recording technique, specifically, high-density magnetic recording is strongly demanded. In order to satisfy this demand, it is required not only to develop a magnetic recording medium having a high coercive force, a large output and low voise, but also to improve the recording characteristic and reproducing sensitivity of a magnetic head in a marked degree. Specifically, with an increase in recording density, the width of recording track is narrowed, and recently it is required to employ a recording track having a width of 20 $\mu$m or less. In this case, when the core of a magnetic head is made of, for example, ferrite, the characteristic of the magnetic head varies widely, since the size of crystal grains forming ordinary polycrystalline ferrite is as large as the width of recording track. In order to reduce variations in the above-mentioned characteristic, the magnetic head is made of monocrystalline ferrite or oriented polycrystalline ferrite. The monocrystalline ferrite has the following advantages: (1) for high-accuracy finishing can be performed; (2) the wear rate of the surface of the magnetic head confronting to the recording medium is uniform; and (3) grain falling-off troubles never take place. Therefore, the magnetic head made of monocrystalline ferrite has been widely employed. However, there is no clear guiding thought as to how the crystallographic axis of the ferrite is to be oriented in the magnetic head. In usual, a favorable orientation of the crystallographic axis is selected in accordance with the manufacturing process of respective types of magnetic heads.

The present inventors have made a wider and deeper study as to how the crystallographic axis of a magnetic material is to be oriented to obtain an excellent recording/reproducing characteristic when a magnetic head is made of a magnetic material having magnetic anisotropy such as monocrystalline ferrite or oriented polycrystalline ferrite. The present invention is based upon the inventors' discovery that a high-performance head is obtained when an angle between that surface of the magnetic head which confronts a magnetic recording medium, and a direction having a maximum magnetic permeability in that part of a magnetic substance having magnetic anisotropy which is near a working gap, is made larger than an orientation angle of the above direction for minimizing the magnetic reluctance along a main magnetic circuit of a magnetic core by an angle within a specified range of angles.

In a magnetic substance having magnetic anisotropy, magnetic permeability varies with direction. That is, in the magnetic substance are two kinds of directions, one of which have a maximum magnetic permeability, and the other have a minimum magnetic permeability. For example, when a disc whose upper and lower surfaces are parallel to a crystal plane <110> is cut out of a ferrite single crystal having a positive magnetocrystalline anisotropy constant $K_1$, the strain induced by working is removed, and magnetic permeability is measured in various directions in the above-mentioned plane, it will be found that the direction having a maximum magnetic permeability and the direction having a minimum magnetic permeability are directions <100> and <110>, respectively, in a relatively low frequency range. This relation is reversed in a high frequency range. Further, the magnetostrictive constants $\lambda_{100}$ and $\lambda_{111}$ of ordinary high-permeability Mn—Zn ferrite are given by the following formulae:

$$\lambda_{100} \leqq 0, \lambda_{111} \geqq 0$$

In the case where a tension having a large strength is applied to the upper and lower surfaces of the above-mentioned disc made of the Mn—Zn ferrite, the direction having a maximum magnetic permeability and the direction having a minimum magnetic permeability are directions <110> and <100>, respectively, in low frequency range, independently of the polarity of the magnetocrystalline anisotropy constant $K_1$. This relation is reversed in a high frequency range. A frequency, at which the above-mentioned relation is reversed, varies depending upon the strength of tension, the value of magnetostrictive constant and the degree of magnetic anisotropy, and can be set within a range from 2 to 10 MHz.

It is well known that the characteristic of a magnetic head depends upon the shape of its magnetic core. As exemplified in FIG. 1, the magnetic core is so designed that a magnetic circuit is narrowed in the neighborhood of a working gap 11 in order to obtain a high efficiency. Incidentally, in FIG. 1, reference numerals 15 and 15' designate high-permeability magnetic materials, 10 a nonmagnetic filler for protecting a gap portion such as glass, and 1 a through hole for forming a ring-shaped magnetic circuit. In a wire-wound type magnetic head, a wire passes through the hole 1 to form a coil. The performance of a magnetic head having such a core as shown in FIG. 1 is mainly determined by the structure and the magnetic characteristic of the core in the neighborhood of the gap. Accordingly, when a magnetic core having such a structure is made of a magnetic material having magnetic anisotropy, it is a very important problem how the direction having a maximum magnetic permeability is oriented in the neighborhood of the gap to obtain a high-performance magnetic head.

In the case where a working gap is made in a bulk magnetic material such as ferrite, a magnetic substance 25 having a surface 23 confronting a recording medium and a slant 24 is attached through a nonmagnetic layer 22 to another magnetic substance 25' having a surface 23' confronting the recording medium and a slant 24', as shown in FIG. 2. Alternatively, as shown in FIG. 3, a magnetic substance 35 with a slant 34 is fixed through a nonmagnetic layer 32 to another magnetic substance 35' without a slant. Further, in the case where a magnetic head having a narrow track width is formed, the thickness of the core is made small only in the neighborhood of the gap and is made large in the remaining region in order to prevent the magnetic reluctance of a main magnetic circuit from being increased. In this case, a part of the core material is cut out in the neighborhood of the gap, as shown in FIG. 1, or grooves 46 are bored through the core material as shown in FIG. 4. Alternatively, a magnetic block 55 having a large width is attached to another magnetic block 55' having a small width and provided with a groove 50, as shown in FIG.

5. Further, as shown in side views of FIGS. 6A and 6B, a narrow portion 66a or 66b may be provided only on one side of a gap 61a or 61b. The performance of a magnetic head having such structures is determined by the characteristic of a track width defining part which forms the gap portion.

The following references are cited to show the state of the art; (i) Japanese Patent Appln. Post-Exam. Bubln. No. 10027/1968 (Japanese publication), and (ii) Japanese Patent Appln. Post-Exam. Publn. No. 10028/1968 (Japanese publication).

SUMMARY OF THE INVENTION

An object of the present invention is to provide a magnetic head in which a magnetic core is made of a magnetic material having magnetic anisotropy and a direction having a maximum magnetic permeability is appropriately oriented in the magnetic core.

In order to attain the above and other objects, a magnetic head according to the present invention comprises a magnetic core formed by facing a pair of magnetic substances through a working gap at a head section confronting a magnetic recording medium, at least one of the magnetic substances having magnetic anisotropy, an angle $\alpha$ and/or an angle $\alpha'$ between a core surface confronting the magnetic recording medium and a direction having a maximum magnetic permeability in the magnetic substance having magnetic anisotropy in a main magnetic circuit plane of the magnetic core being made larger than an orientation angle of the above direction for minimizing a magnetic reluctance of a main magnetic circuit of the magnetic core by a specific angle. A range of each of the angles $\alpha$ and $\alpha'$, the kind of the magnetic substance, the shape of the magnetic head, and others will be described later. Incidentally, the angles $\alpha$ and $\alpha'$ are indicated in FIG. 8.

DETAILED DESCRIPTION OF THE INVENTION

In order to find an optimum orientation of the direction having a maximum magnetic permeability in the above-mentioned track width defining part, the present inventors have calculated, on the basis of a model whose main magnetic circuit plane is shown in FIG. 7, a leakage current density generated in the neighborhood of a working gap 71 when a constant current flows through coils 77 and 77'. In more detail, Maxwell's equations for various orientation angles of the direction having a maximum magnetic permeability in each of track width defining parts 76 and 76' have been solved using a limited element method to obtain the leakage flux density near the working gap. In FIG. 7, reference numeral 78 designates the same magnetic substance as the track width defining part 76 or a magnetic substance different from the part 76, and 78' the same magnetic substance as the track width defining part 76' or a magnetic substance different from the part 76'. The above model is a two-dimensional model for convenience of calculation, and in order to take the effect of a difference in thickness between the track width defining parts and the remaining part of the magnetic core into account, the magnetic permeability of the remaining part of the core is assumed to be R times greater than the actual one, where R is a ratio of the thickness of the remaining part of the core to that of the track width defining parts. The dimension of each of parts forming a magnetic circuit has been so determined that a ratio of the effective reluctance of the track width defining parts including the gap to the effective reluctance of the remaining magnetic circuit part is less than 0.2, and that interfaces 79 and 79' between the remaining part of the magnetic core and the track width defining parts become an equi-potential plane. Thus, the results of calculation have been little affected by a change in the dimension of the remaining part of the magnetic core. FIG. 8 is an enlarged view of the track width defining parts having been used in the above-mentioned calculation. In FIG. 8, reference character G designates a gap length, D a gap depth, L a length of a first track width defining part with a slant 84, $\theta$ an angle between the slant 84 and a surface 83 confronting a magnetic recording medium, $\phi$ an angle between the surface 83 and an interface 89 between the first track defining part and the remaining part of the core, L' a length of a second track width defining part without a slant, and D' a depth of the second track width defining part. Now, the contents and results of the above-mentioned calculation will be explained below in detail. In order to know relations between the leakage flux density and directions 80 and 80' each having a maximum magnetic permeability in the first or second track width defining part, the dependency of the leakage flux density on angles $\alpha$ and $\alpha'$ is calculated, where $\alpha$ is an angle between the surface 83 and the direction 80 having a maximum magnetic permeability, and $\alpha'$ is an angle between a surface 83' of the second track width defining part confronting the magnetic recording medium and the direction 80' having a maximum magnetic permeability.

FIG. 9 shows variations in the X-component of flux density at each of points P and $P_o$ shown in FIG. 10, in the case where the second track width defining part shown in FIG. 8 is made of an isotropic magnetic material and the angle $\alpha$ in the first track width defining part is varied. (Incidentally, the Y-component of flux density at each of the points P and $P_o$ is nearly equal to zero.) In FIG. 10, the Y-axis is the center line of a working gap, and the X-axis lies on a surface of a magnetic core confronting a recording medium. Curves in FIG. 9 show the results of calculation obtained in the case where a ratio of a magnetic permeability $\mu_{max}$ of the anisotropic magnetic substance in the maximum permeability direction to a magnetic permeability $\mu_{min}$ in the minimum permeability direction is made equal to 5, where the maximum permeability direction is perpendicular to the minimum permeability direction, where a ratio $\bar{\mu}G/L$ is made equal to 1.5 when $\bar{\mu}$ is given by an equation $\bar{\mu} = \frac{1}{2}(\mu_{max} + \mu_{min})$, where a ratio D/L is made equal to 0.5, and where the angles $\theta$ and $\phi$ are made equal to 20° and 90°, respectively. Values on ordinate indicate magnetic flux densities normalized by a peak value. As is apparent from FIG. 9, the leakage flux density at the point P in the case where the current flowing through coils is fixed is strongly dependent upon the angle $\alpha$, and has a maximum value when the angle $\alpha$ is equal to 23.1°. In other words, an angle $\alpha_{max}$ for making the leakage flux density maximum is equal to 23.1°. Further, the flux density at the center $P_o$ of the gap is also strongly dependent upon the angle $\alpha$, and an angle $\alpha_{o\,max}$ for making the flux density maximum is equal to 7.4°, that is, smaller than the angle $\alpha_{max}$. Thus, a relation between the angles $\alpha_{max}$ and $\alpha_{o\,max}$ is given by the following formula:

$$\Delta\alpha \equiv \alpha_{max} - \alpha_{o\,max} = 15.7° > 0$$

When the angle α is made equal to the angle $\alpha_{o\,max}$, the magnetic reluctance along the main magnetic circuit of the magnetic core becomes nearly equal to a minimum value. Accordingly, the above-mentioned formula shows that, in order to make maximum the leakage flux density at a point above the gap, it is required to make the angle α larger than a value of α for making minimum the magnetic reluctance along the main circuit of the magnetic core.

The value of Δα varies with the shape, dimension and magnetic characteristic of the track width defining part, the gap length, and the distance between the point P and the core surface confronting the magnetic recording medium. Especially, the value of Δα is strongly dependent upon a ratio D/L. According to the results of a more detailed study, Δα is increased as the ratio D/L is larger. In other words, Δα is increased while keeping a linear relation between Δα$_o$ and D/L when the ratio D/L has smaller values, and never exceeds 45°. That is, when the ratio D/L has larger values, Δα approaches a saturation value less than 45°. FIG. 11 shows relations between Δα$_o$ and D/L for various values of parameter $\bar{\mu}$G/L in the case where angles φ and θ are made equal to 90° and 20°, respectively, where Δα$_o$ indicates the value of Δα at a point O (O, O) shown in FIG. 10. FIG. 12 shows relations between (Δα $_Y$−Δα$_o$) and Y/L for various values of parameters $\bar{\mu}$G/L and D/L in the case where the angles φ and θ are made equal to 90° and 20°, respectively, where Δα$_Y$ indicates a difference between an angle α$_{max}$ (O, Y) for making maximum the leakage flux density at a point (O, Y) and the angle α$_{o\,max}$. The value of (Δα$_Y$−Δα$_o$) is not greater than several degrees (e.g., not greater than 10° or 5°), so far as the value of Y/L lies in a practical range from 0 to 0.1. Curves a, b, c, d, e and f shown in FIG. 12 correspond to the values of μG/L and D/L shown in the following table:

TABLE 1

| Curve | G/L | D/L |
|---|---|---|
| a | 0.2 | 0.25 |
| b | 1.5 | 0.25 |
| c | 20 | 0.25 |
| d | 3.8 | 1.0 |
| e | 3.8 | 0.5 |
| f | 3.8 | 0.25 |

On the other hand, the influence of respective values of $\mu_{max}/\mu_{min}$ and θ upon Δα is relatively small. FIG. 13 shows an example of the influence of the value of $\mu_{max}/\mu_{min}$ upon Δα. In FIG. 13, there is shown the dependence of Δα$_o$ on $\bar{\mu}$G/L in the case where the angles θ and φ are made equal to 20° and 90°, respectively, the ratio D/L is made equal to 0.25, and the ratio $\mu_{max}/\mu_{min}$ is made equal to 2 and 5. As is evident from FIG. 13, is scarcely dependent upon the value of $\mu_{max}/\mu_{min}$. FIG. 14 shows relations between Δα$_o$ and D/L for various values of parameter θ in the case where the angle φ and the ratios $\bar{\mu}$G/L and $\mu_{max}/\mu_{min}$ are made equal to 90°, 1.5 and 5, respectively. As is apparent from FIG. 14, for the same value of D/L, the value of Δα$_o$ lies within a range from an angle which is 3° larger than a mean value, to another angle which is 3° smaller than the mean value, when the value of θ is varied from 20° to 60°.

Further, it has been confirmed that the angle α$_{o\,max}$ for making maximum the flux density at the center (0, −D/2) of the working gap is mainly dependent upon θ and D/L and is scarcely affected by $\bar{\mu}$ and G. FIG. 15 shows relations between α$_{o\,max}$ and D/L for various values of parameter θ. As is apparent from FIG. 15, the angle α$_{o\,max}$ is decreased monotonically when the ratio D/L is increased, and the angle α$_{o\,max}$ is increased as the angle θ becomes larger but never exceeds 22° so far as the angle θ is not more than 60°. The angle α$_{max}$ for making maximum the leakage flux density at a point above the working gap is given by (α$_{o\,max}$+Δα). As mentioned previously, the dependence of α$_{o\,max}$ on D/L and the dependence of Δα on D/L act so as to offset each other. Therefore, the dependence of α$_{max}$ on D/L is gentle, and the value of α$_{max}$ lies within a relatively small range. FIG. 16 shows relations between α$_{max}$ (0, 0) and D/L for various values of parameter θ in the case where the ratio $\bar{\mu}$G/L is made equal to 1.5.

In the foregoing description, explanation has been made on only the case where the angle φ is made equal to 90°. In the case where the angle φ is made less than 90°, the abovementioned dependence of α$_{max}$ on L holds if the length L is replaced by an effective length L* of the track width defining part which is an intermediate length between the lengths L and L". FIG. 17 shows the dependence of α$_{max}$ on φ in the case where the ratios $\bar{\mu}$G/L, D/L and $\mu_{max}/\mu_{min}$ are made equal to 1.5, 0.25 and 5, respectively. As is seen in FIG. 17, the angle α$_{max}$ is slightly increased as the angle φ is decreased from 90°. This phenomenon can be explained from the fact that the effective length L* of the track width defining part is gradually decreased as the angle φ is decreased.

It has been clarified from more detailed analysis similar to the above-mentioned studies that Δα is within a range indicated by a hatched area in FIG. 18, in the case where the angle θ lies in a practical range from 20° to 60°, the value of $\bar{\mu}$G/L lies in a practical range from 0.2 to 20, and the value of Y/L lies in a practical range from 0 to 0.1. That is, for the range of D/L shown in FIG. 18, Δα is given by the following fomula:

$$\left(\frac{20D}{L}\right)^\circ \lesssim \Delta\alpha \lesssim \min\left[\left(\frac{30D}{L}+10\right)^\circ, 40°\right]$$

where a sign min [a, b] indicates the smaller of a and b. Further, it is needless to say that a magnetic head having an excellent recording characteristic can be obtained by making maximum the leakage flux density which is generated above the working gap when a constant current flows through the coil. It is evident from the principle of reciprocity that the reproducing characteristic of the magnetic head is also excellent when the leakage flux density is made maximum. Therefore, a magnetic head having an excellent characteristic can be obtained when the angle α at the track width defining part is made larger than the angle α$_{o\,max}$ for minimizing the magnetic reluctance along the main magnetic circuit of the magnetic core by a value within the range of Δα shown in FIG. 18. Referring back to FIG. 9, when the angle α is in a range of an optimum value ±5°, or in a range of the optimum value ±10°, a magnetic head has a relatively excellent characteristic. Accordingly, a magnetic head has a relatively excellent characteristic, when the difference β between the angles α and α$_{o\,max}$ (namely, β≡α−α$_{o\,max}$) is given by the following formulae:

$$\left(\frac{20D}{L}-5\right)^\circ \lesssim \beta \lesssim \min\left[\left(\frac{30D}{L}+15\right)^\circ, 45^\circ\right]$$

$$\left(\frac{20D}{L}-10\right)^\circ \lesssim \beta \lesssim \min\left[\left(\frac{30D}{L}+20\right)^\circ, 50^\circ\right]$$

Further, from a detailed study of the dependence of $\alpha_{o\,max}$ on $\theta$ and D/L such as exemplified in FIG. 15, the following facts are known. That is, in the case where the ratio $\bar{\mu}G/L$, the angle $\theta$ and the ratio Y/L are equal to 0.2, 60° and 0.1, respectively, the relation between $\alpha_{max}$ and D/L is given by a curve ① shown in FIG. 19. In the case where $\bar{\mu}G/L$, $\theta$ and Y/L are equal to 20, 20° and 0, respectively, the relation between $\alpha_{max}$ and D/L is given by a curve ② shown in FIG. 19. Further, in the case where the value of $\bar{\mu}G/L$ lies within a range from 0.2 to 20, the angle $\theta$ lies in a range from 20° to 60°, and the value of Y/L lies in a range from 0 to 0.1, the angle $\alpha_{max}$ has a value within a range bounded by the two curves ① and ②. For the range of D/L shown in FIG. 19, the curves ① and ② are approximately given by equations $$\alpha = \min\left[\left(\frac{25D}{L}+30\right)^\circ, 45^\circ\right] \text{ and } \alpha = \left(\frac{15D}{L}+10\right)^\circ,$$

respectively. Accordingly, in the case where the ratio $\bar{\mu}G/L$ has a value of 0.2 to 20 and the angle $\theta$ has a value of 20° to 60°, a magnetic head having an excellent characteristic can be obtained when the angle $\alpha$ is given by the following formula:

$$\left(\frac{15D}{L}+10\right)^\circ \lesssim \alpha \lesssim \min\left[\left(\frac{25D}{L}+30\right)^\circ, 45^\circ\right]$$

The above fact shows that an optimum value of $\alpha$ for causing a magnetic head to have an excellent characteristic lies in a range from 10° to 45° in the case where each of $\mu G/L^*$ and D/L* has an ordinary value. As mentioned previously, the dependence of the characteristic of a magnetic head on $\alpha$ is relatively gentle. Accordingly, a magnetic head having a relatively excellent characteristic can be obtained by setting the angle $\alpha$ in a range which is 5° smaller in lower limit and 5° larger in upper limit than the above-mentioned range of $\alpha$ or in a range which is 10° smaller in lower limit and 10° larger in upper limit than the above-mentioned range of $\alpha$.

Further, when the angle $\theta$ is within a range from 20° to 35°, the angle $\alpha_{max}$ is required to lie in a range shown in FIG. 20. That is, it is desirable that, in a magnetic head having an angle $\theta$ of 20° to 35°, the angle $\alpha$ is given by a formula $$\left(\frac{15D}{L}\right)^\circ \lesssim \alpha \lesssim \min\left[\left(\frac{25D}{L}+40\right)^\circ, 45^\circ\right],$$

preferably by a formula $$\left(\frac{15D}{L}+5\right)^\circ \lesssim \alpha \lesssim \min\left[\left(\frac{25D}{L}+35\right)^\circ, 40^\circ\right],$$

more preferably by a formula $$\left(\frac{15D}{L}+15\right)^\circ \lesssim \alpha \lesssim \min\left[\left(\frac{25D}{L}+30\right)^\circ, 35^\circ\right]$$

On the other hand, when the angle $\theta$ is within a range from 35° to 60°, the angle $\alpha_{max}$ is required to lie in a range shown in FIG. 21. Accordingly, it is desirable that, in a magnetic head having an angle $\theta$ of 35° to 60°, the angle $\alpha$ is given by a formula $$\left(\frac{5D}{L}+10\right)^\circ \lesssim \alpha \lesssim \min\left[\left(\frac{25D}{L}+40\right)^\circ, 45^\circ\right],$$

preferably by a formula $$\left(\frac{5D}{L}+15\right)^\circ \lesssim \alpha \lesssim \min\left[\left(\frac{25D}{L}+35\right)^\circ, 45^\circ\right],$$

more preferably by a formula $$\left(\frac{5D}{L}+20\right)^\circ \lesssim \alpha \lesssim \min\left[\left(\frac{25D}{L}+30\right)^\circ, 45^\circ\right].$$

In the foregoing description, explanation has been made on an optimum orientation of a direction having a maximum magnetic permeability in a magnetic substance having magnetic anisotropy, in the case where the track width defining part with the slant is formed of the anisotropic magnetic substance. Next, explanation will be made on the case where the track width defining part without a slant is formed of a magnetic substance having magnetic anisotropy. Now, let us consider the case where a magnetic head has the track width defining parts shown in FIG. 8, the track width defining part with the slant 84 is formed of an isotropic magnetic substance, and the track width defining part without a slant is formed of a magnetic substance having magnetic anisotropy. FIG. 22 shows relations between the leakage flux density at the point P (0, G) shown in FIG. 10 and the angle $\alpha'$ for various values of parameter D/L'. As mentioned previously, the angle $\alpha'$ is an angle between a surface of the track width defining part confronting a magnetic recording medium and a direction having a maximum magnetic permeability in the track width defining part. In FIG. 22, a leakage flux density along ordinate is given by a relative value. Further, FIG. 22 shows the above-mentioned relations in the case where the ratios D'/L', $\bar{\mu}G/L'$ and $\mu_{max}/\mu_{min}$ are equal to 4, 3 and 5, respectively. In FIG. 22, a mark $\Delta$ indicates a maximum leakage flux density. The value of $\alpha'$ corresponding to the above-mentioned maximum leakage flux density, namely, $\alpha'_{max}$ is plotted against D/L' for various values of parameter $\bar{\mu}G/L'$ in FIG. 23. In FIG. 23, the angle $\alpha'_{max}$ corresponds to the leakage flux density at the point P (0, G). Like the dependence of $\alpha_{max}$ on Y/L, the dependence of $\alpha'_{max}$ on Y/L' is relatively gentle, and therefore the value of $\alpha'_{max}$ lies in a range which is 5° smaller in lower limit and 5° larger in upper limit than the values of $\alpha'_{max}$ shown in FIG. 23, so far as the value of Y/L' is in a practical range. On the other hand, the value of $\alpha'$ for making maximum the flux density at the center $P_o$ (0, −D/2) of the gap, namely $\alpha'_{o\ max}$ varies with D/L' as shown in FIG. 24. The relation between $\alpha'_{o\ max}$ and D/L' shown in FIG. 24 is substantially kept unchanged, so far as the value of $\bar{\mu}$G/L' lies in a range from 0.2 to 20. As is apparent from the comparison between FIGS. 23 and 24, the angle $\alpha'_{max}$ is greater than the angle $\alpha'_{o\ max}$. However, the value of $(\alpha'_{max} - \alpha'_{o\ max})$ does not exceed 25°, when the value of each of D/L' and $\bar{\mu}$G/L' lies in a range shown in FIGS. 23 and 24. FIG. 25 shows the dependence of $\alpha'_{max}$ (0, G) on L'/D, in the case where a ratio of the depth D' of the track width defining part without a slant to the gap depth D is made equal to 8 and the value of $\bar{\mu}$G/D is varied in a range from 1 to 20. In FIG. 25, however, only relations between $\alpha'_{max}$ (0, G) and L'/D for two values (1 and 20) of $\bar{\mu}$G/D are plotted, and the value of $\alpha'_{max}$ (0, G) lies in a region bounded by two curves, namely, a shaded area so far as the value of $\bar{\mu}$G/D is in a range from 1 to 20. Further, in a magnetic head having a track width defining part 266' shown in FIG. 26, the value of $\alpha'_{max}$ becomes nearly equal to 45°, when the value of $\bar{\mu}$G/D is in a range from 1 to 20. This fact and the facts shown in FIGS. 23 and 25 indicate that a magnetic head having an excellent characteristic can be obtained by setting the angle $\alpha'$ in a range from 15° to 45° when the dimension and magnetic characteristic of the track width defining part without a slant are in the above-mentioned practical ranges. Further, a magnetic head having a more excellent characteristic can be obtained when the value of D/L' is in a range from 0.05 to 0.25 and the angle $\alpha'$ lies in a range from 25° to 45°.

In the foregoing description, explanation has been made on the case where only one of magnetic substances facing each other with the gap therebetween has magnetic anisotropy. In the case where both of the magnetic substances have magnetic anisotropy, a magnetic head having an excellent characteristic can be obtained by setting each of the angles $\alpha$ and $\alpha'$ in the above-mentioned optimum range in accordance with the shape and dimension of the track width defining part formed of the magnetic substance. In the case where two track width defining parts are different in shape and dimension from each other, it is desirable that an angle between the plane confronting a magnetic recording medium and a direction having a maximum magnetic permeability in one magnetic substance is made different from an angle between the above plane and a direction having a maximum magnetic permeability in the other magnetic substance. In magnetic materials of some sort, however, if the directions each having a maximum magnetic permeability are so determined as mentioned above, the track width defining parts may be different in wear rate from each other when the magnetic recording medium is slided on the track width defining parts. In this case, it is desirable to select the values of $\alpha$ and $\alpha'$ so that these values are nearly equal to each other and lie in the above-mentioned ranges of $\alpha$ and $\alpha'$, respectively.

A magnetic head in which each of the angles $\alpha$ and $\alpha'$ lies in the above-mentioned range, can be formed in the following manners.

(1) At least one of a pair of track width defining parts is made of monocrystalline Mn-Zn ferrite having a positive magnetocrystalline anisotropy constant $K_1$, and the main magnetic circuit plane of the track width defining part is substantially formed of a crystal plane (110). In order that a direction <100> in the plane (110) is a direction having a maximum magnetic permeability in a low frequency range, the residual stress in the track width defining part is made as small as possible. An angle between the direction <100> and a surface of the track width defining part confronting a magnetic recording medium is set in the previously-mentioned range in accordance with structural factors of a magnetic core. In order to make the above stress as small as possible, the stress generated at a working time is removed through various etching techniques. Further, in the case where glass or the like is melted and made adhere to the track width defining part to protect this part, it is required that the coefficient of thermal expansion of glass is nearly equal to that of the above-mentioned ferrite in a temperature range from an operating temperature of magnetic head to an adhesion temperature.

(2) At least one of a pair of track width defining parts is made of monocrystalline Mn-Zn ferrite having a positive magnetocrystalline anisotropy constant $K_1$, and the main magnetic circuit plane of the track width defining part is substantially formed of a crystal plane (110). In order that a direction <110> in the plane (110) is a direction having a maximum magnetic permeability in a high frequency range, the residual stress in the track width defining part is made as small as possible. An angle between the direction <110> and surface of the track width defining part confronting a magnetic recording medium is set in the previously-mentioned range in accordance with structural factors of a magnetic core.

(3) At least one of a pair of track width defining parts is made of monocrystalline Mn-Zn ferrite having a negative magnetostrictive constant $\lambda_{100}$, and the main magnetic circuit plane is substantially formed of a crystal plane (110). In order that a direction <100> in the plane (110) is a direction having a maximum magnetic permeability in a low frequency range, an axial compression is caused to remain in the track width defining part between a direction inclined at +30° to the direction <100> and another direction inclined at −30° to the direction <100>, (for example, by bonding two core halves with glass or the like while compressing these halves by means of a jig). Further, an angle between the direction <100> and a surface of the track width defining part confronting a magnetic recording medium is set in the previously-mentioned range.

(4) At least one of a pair of track width defining parts is made of monocrystalline Mn-Zn ferrite having a negative magnetostrictive constant $\lambda_{100}$ and a positive magnetostrictive constant $\lambda_{111}$, and the main circuit plane of the track width defining part is substantially formed of a crystal plane (110). A tension is caused to remain in the plane (110), in order for a direction <100> in the plane (110) to be a direction having a maximum magnetic permeability in a high frequency range. Further, an angle between the direction <100> and a surface of the track width defining part confronting a magnetic recording medium is set in the previously-mentioned range.

(5) At least one of a pair of track width defining parts is made of monocrystalline Mn-Zn ferrite having a negative magnetostrictive constant $\lambda_{100}$ and a positive magnetostrictive constant $\lambda_{111}$, and the main magnetic circuit plane of the track width defining part is substantially formed of a crystal plane (110). A tension is caused to remain in the plane (110) by, for example, a method which will be described in EMBODIMENT 1, in order for a direction <110> in the plane (110) to be a direction having a maximum magnetic permeability in a low frequency range. Further, an angle between the direction <110> and a surface of the track width defining part confronting a magnetic recording medium is set in the previously-mentioned range.

(6) At least one of a pair of track width defining parts is made of monocrystalline Mn-Zn ferrite having a negative magnetocrystalline anisotropy constant $K_1$, and the main magnetic circuit plane of the track width defining part is substantially formed of a plane including one crystallographic axis <111>. In order that the axis <111> is a direction having a maximum magnetic permeability in a low frequency range, the residual stress in the track width defining part is made as small as possible. Further, an angle between the axis <111> and a surface of the track width defining part confronting a magnetic recording medium is set in the previously-mentioned range.

(7) At least one of a pair of track width defining parts is made of monocrystalline Mn-Zn ferrite having a negative magnetocrystalline anisotropy constant $K_1$, and the main magnetic circuit plane of the track width defining part is substantially formed of a plane including one crystallographic axis <111>. In order that a direction in the plane which is perpendicular to the axis <111>, is a direction having a maximum magnetic permeability in a high frequency range, the residual stress in the track width defining part is made as small as possible. An angle between the above-mentioned direction having a maximum magnetic permeability and a surface of the track width defining part confronting a magnetic recording medium is set in the previously-mentioned range.

(8) Oriented polycrystalline ferrite, a rolled magnetic material, a splat cooled amorphous ribbon, a thin magnetic permalloy or Fe-Si film or amorphous magnetic alloy film having induced anisotropy, an Fe-Si single crystal, and an Fe-Al-Si single crystal are used as the above-mentioned magnetic material having magnetic anisotropy, in place of the monocrystalline ferrite.

In the case where it is required to confirm a direction having a maximum magnetic permeability in carrying out the present invention, a residual stress in the track width defining part is assumed, and a disc-shaped sample is prepared which has the residual stress and whose main surface corresponds to the main magnetic circuit plane of the track width defining part. Then, the magnetic permeability is measured in various direction at a frequency used. It is needless to say that such measurement is well known.

An orientation angle of the direction having a maximum magnetic permeability for minimizing the magnetic reluctance of a magnetic core is determined in such a manner that magnetic cores having various orientation angles are prepared, a coil having a fixed number of turns is wound around each magnetic core, and the desired orientation angle is determined by a magnetic core showing a maximum inductance.

Needless to say, a magnetic head according to the present invention may be formed in the same manner as conventional magnetic heads, except for the above-mentioned matters.

When that surface of the track width defining part made of monocrystalline Mn-Zn ferrite which confronts a magnetic recording medium, is a crystal plane (211), the surface is low in wear resistance. In the case where great importance is placed on the wear resistance of a magnetic head, such a crystal orientation in the track width defining part should be avoided.

DESCRIPTION OF THE PREFERRED EMBODIMENTS

EMBODIMENT 1

Figure 1:
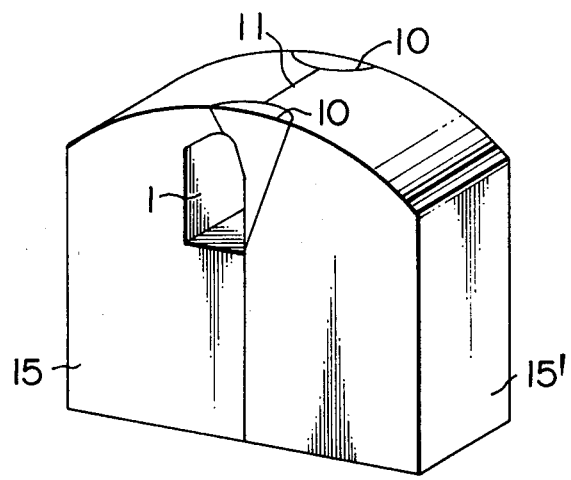
FIG. 1 is a perspective view showing an example in structure of a magnetic head, to which the present invention is applied.
Figure 2:
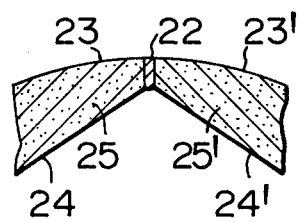
FIGS. 2 and 3 are sectional views for showing different examples of the gap portion of a magnetic head, to which the present invention is applied.
Figure 3:
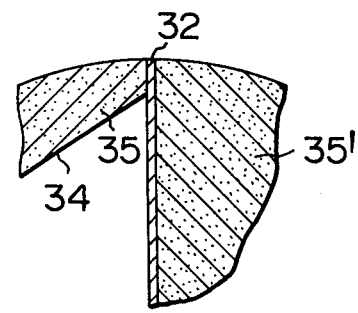
Figure 4:
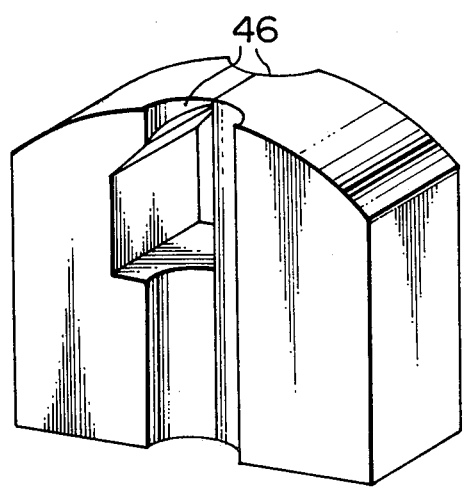
FIGS. 4 and 5 are perspective views for showing different examples in structure of a magnetic head, to which the present invention is applied.
Figure 5:
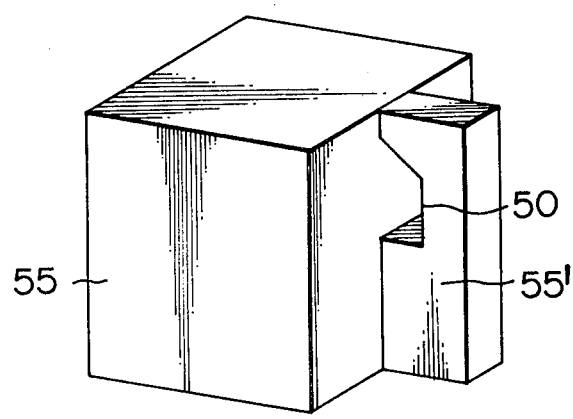
Figure 6A:
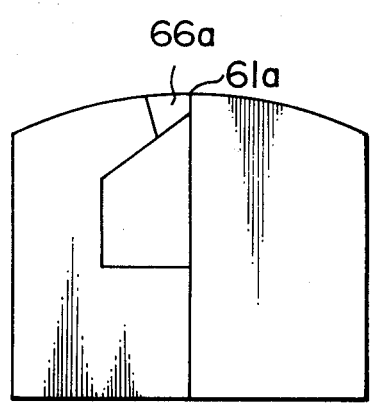
FIGS. 6A and 6B show, in section, different structures of the track width defining part of a magnetic head, to which the present invention is applied.
Figure 6B:
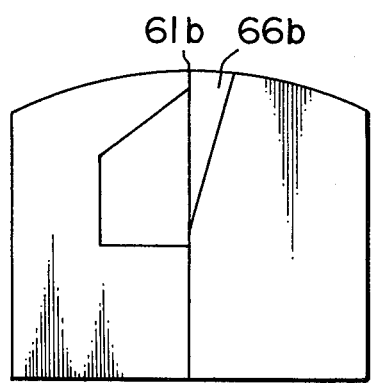
Figure 27:
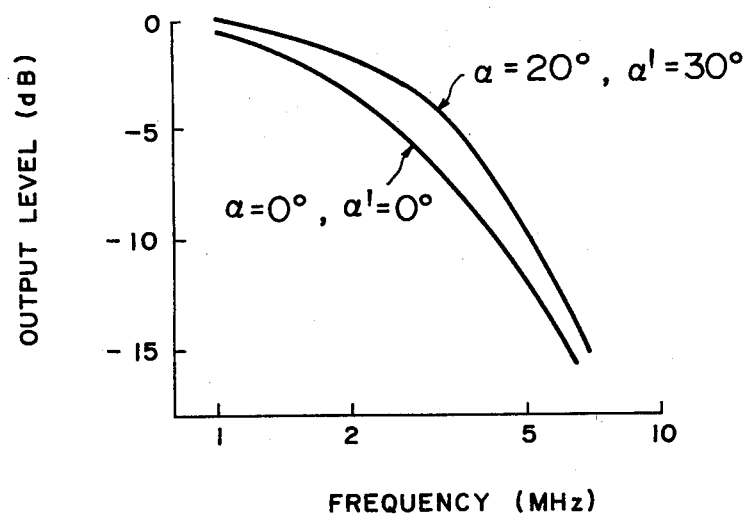
FIGS. 27 and 28 are graphs showing the dependence of output level on frequency in different embodiments of a magnetic head according to the present invention.

Two magnetic heads were prepared, each of which had such a form as shown in FIG. 1 and was formed by bonding a C-shaped core half and an I-shaped core half. Each of the C-shaped and I-shaped core halves was made of monocrystalline Mn-Zn ferrite having a magnetocrystalline anisotropy constant $K_1$ of about $0.2 \times 10^4$ erg/cc, a magnetostrictive constant $\lambda_{100}$ of about $-0.5 \times 10^{-5}$ and a magnetostrictive constant $\lambda_{111}$ of about $0.3 \times 10^{-5}$. In each magnetic head, the main magnetic circuit plane was substantially formed of a crystal plane (110), and the track width was made equal to 30 $\mu$m. Further, on the side of the C-shaped core half, the length L of the track width defining part with a slant, the angle $\theta$ inclination of the slant, the angle $\theta$ and the gap depth D were made equal to 150 $\mu$m, 25°, 70° and 50 $\mu$m, respectively. On the other hand, on the side of the I-shped core half, the length L' and depth D' of the track width defining part without a slant were made equal to 150 $\mu$m and 400 $\mu$m, respectively. Further, the thickness of parts of the core other than the track width defining parts was made equal to 150 $\mu$m and the gap length G was made nearly equal to 0.5 $\mu$m. In one of the magnetic heads, the angles $\alpha$ and $\alpha'$ between a direction $<110>$ in the main magnetic circuit plane (110) and a core surface confronting a magnetic recording medium were made equal to 20° and 30°, respectively. In the other magnetic head, both of the above-mentioned angles $\alpha$ and $\alpha'$ were made equal to zero. Glass exhibiting a thermal compression of about $3.2 \times 10^{-3}$ when cooled from an adhesion temperature to room temperature was melted and made to adhere to the track width defining parts to protect the gap. This thermal compression was smaller than the thermal compression of the above-mentioned ferrite in the same temperature range by $0.7 \times 10^{-3}$. Accordingly, a tension was applied to side faces of each track width defining part. Owing to this tension, a direction having a maximum magnetic permeability in a frequency range less than 7 to 8 MHz in the main magnetic circuit plane (110) of each track width defining part became parallel to the direction $<110>$. The recording/reproducing characteristic of the magnetic heads thus formed was measured using a magnetic tape with a coercive force of about 700 Oe. As a result of the measurement, frequency responses shown in FIG. 27 were obtained. Incidentally, the measurement was carried out at a tape speed of about 6 m/sec.

EMBODIMENT 2

Figure 28:
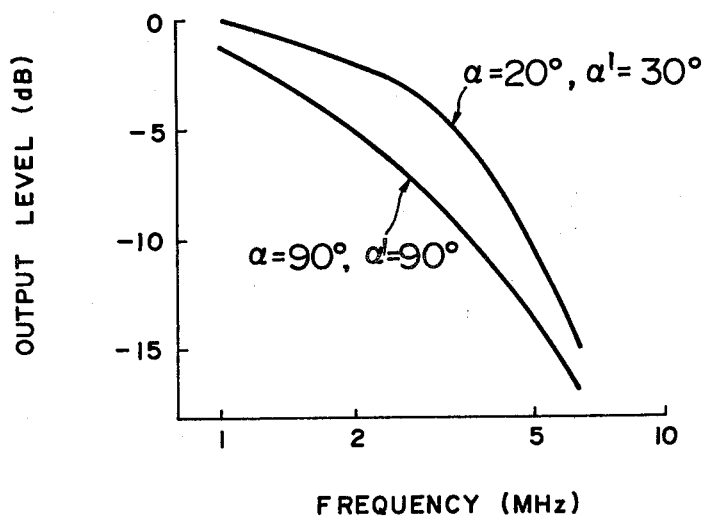

Two magnetic heads were prepared, each of which included a magnetic core made of the same magnetic material and having the same form as the core in EMBODIMENT 1. Glass exhibiting a thermal compression of about $3.9 \times 10^{-3}$ when cooled from an adhesion temperature to room temperature was melted and made to adhere to the track width defining parts to form the magnetic heads. When an angle between a direction $<100>$ (namely, a direction having a maximum magnetic permeability in a frequency range less than 7 to 8 MHz) in the main magnetic circuit plane (110) of each track width defining part and a core surface confronting a magnetic recording medium was expressed by $\alpha$ or $\alpha'$, the angles $\alpha$ and $\alpha'$ were made equal to 20° and 30°, respectively, in one magnetic head, and both of the angles $\alpha$ and $\alpha'$ were made equal to 90° in the other magnetic head. The recording/reproducing characteristics of these magnetic heads was measured using a magnetic tape with a coercive force of 700 Oe. The results of the measurement are shown in FIG. 28. The measurement was carried out at a tape speed of about 6 m/sec.

EMBODIMENT 3

Figure 7:
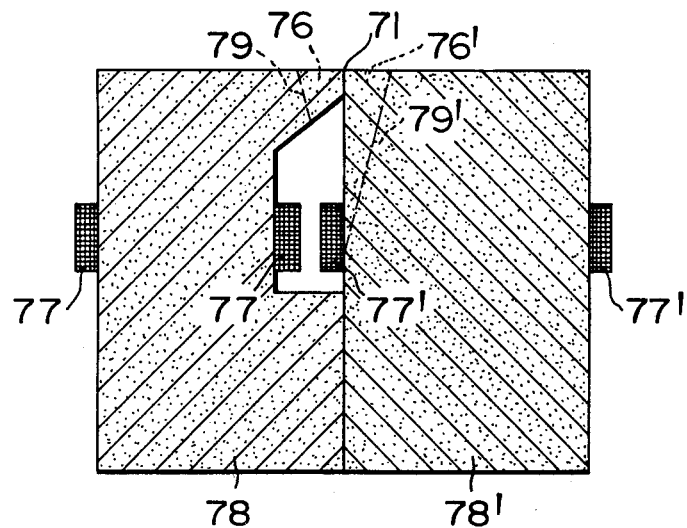
FIG. 7 is a sectional view of a model of magnetic head which was used to achieve the present invention.
Figure 8:
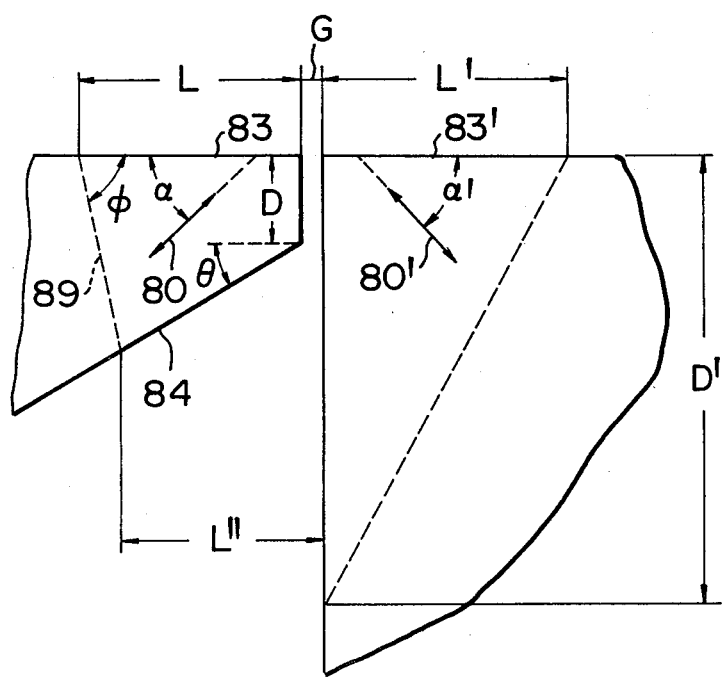
FIG. 8 is a detailed diagram of a gap portion of the model shown in FIG. 7.
Figure 9:
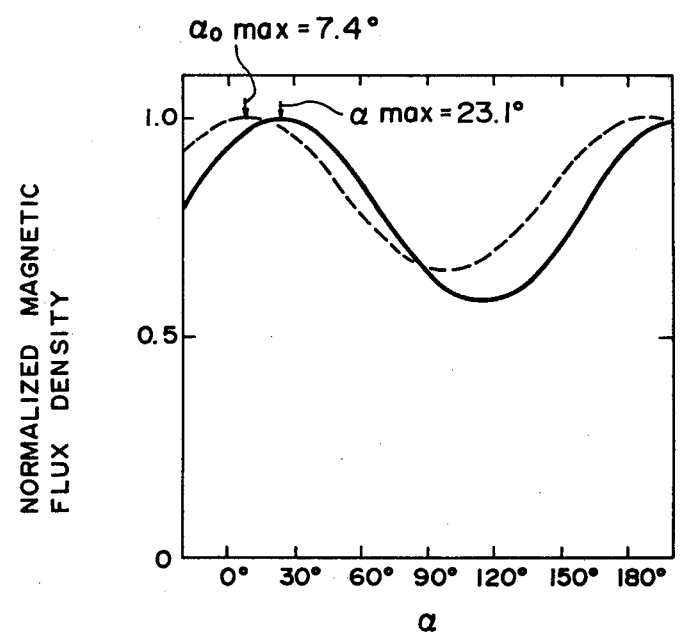
FIG. 9 is a graph showing the dependence of magnetic flux density on orientation angle of an axis of magnetic anisotropy, which is obtained by the calculation using the model shown in FIG. 7.
Figure 10:
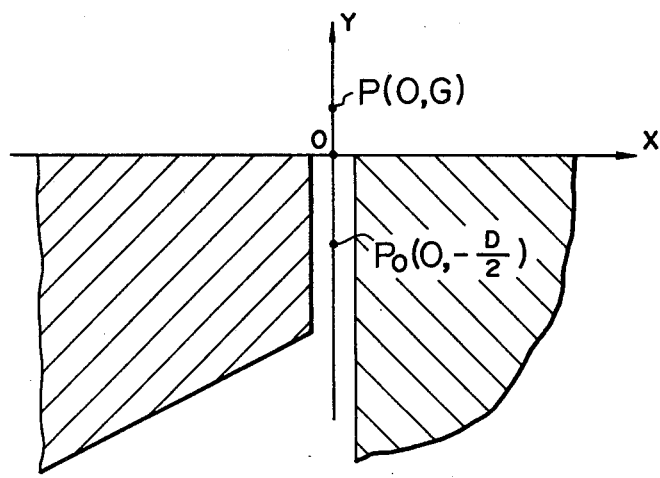
FIG. 10 is a sectional view of a gap portion of the above model.
Figure 11:
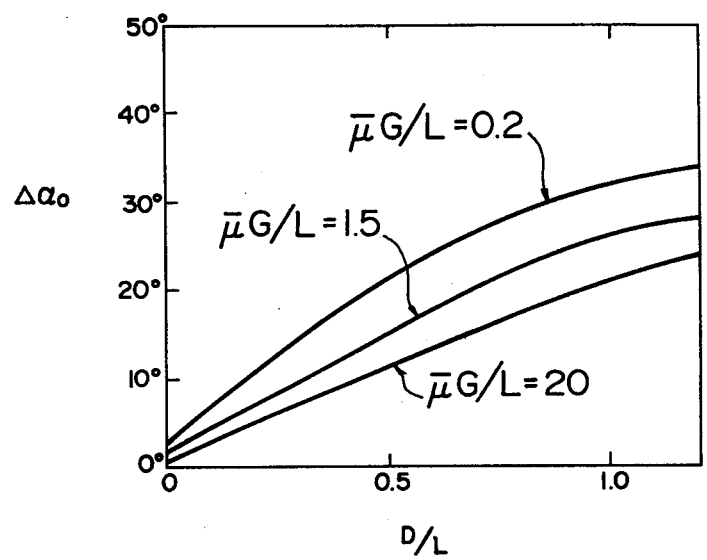
FIG. 11 is a graph showing relations between $\Delta\alpha_o$, which is a difference between an orientation angle $\alpha_o$ $max$ of an axis of magnetic anisotropy for maximizing the flux density at the center of a gap and an orientation angle $\alpha_{max}$ (0, 0) for maximizing the flux density at a point (0, 0) on the gap, and a dimensional ratio of a track width defining part.
Figure 12:
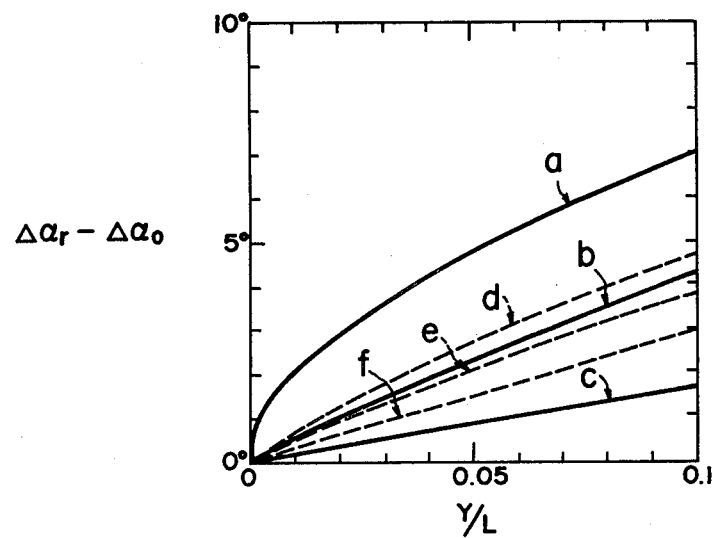
FIG. 12 is a graph showing the dependence of a difference between an orientation angle $\alpha_{max}$ (0, Y) for maximizing the flux density at a point (0, Y) above a gap and an orientation angle for maximizing the flux density at a point (0, 0) on the gap, on Y.
Figure 13:
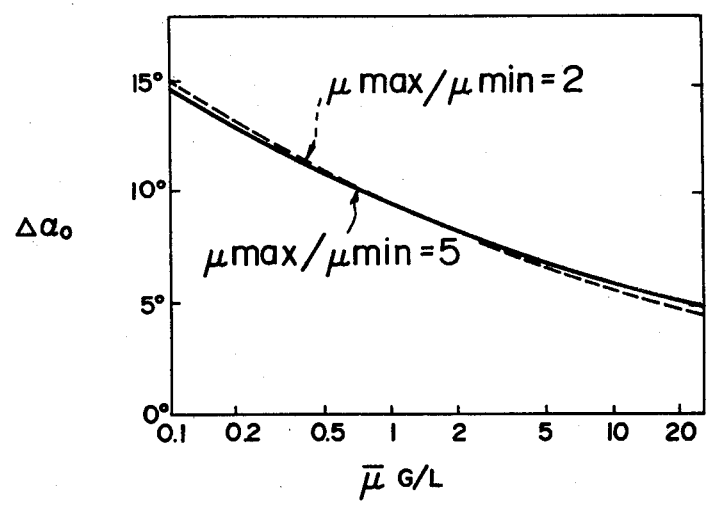
FIG. 13 is a graph showing relations between $\Delta\alpha$ and effective gap length.
Figure 14:
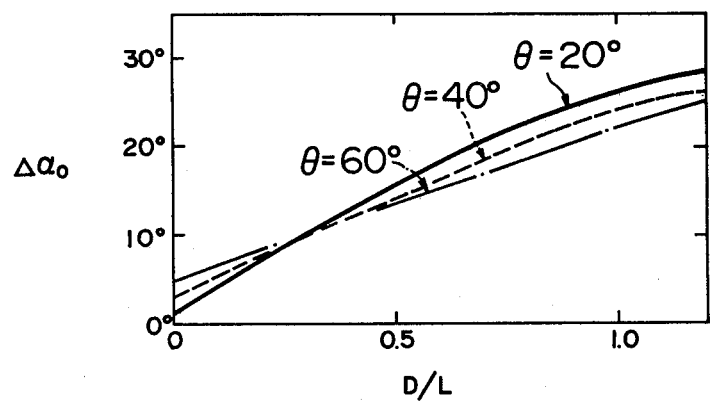
FIG. 14 is a graph showing relations between $\Delta\alpha_o$, which is a difference between an orientation angle $\alpha_o$ $max$ of an axis of magnetic anisotropy for maximizing the flux density at the center of a gap and an orientation angle $\alpha'_{max}$ (0, 0) for maximizing the flux density at a point (0, 0) on the gap, and a dimensional ratio of a track width defining part.
Figure 15:
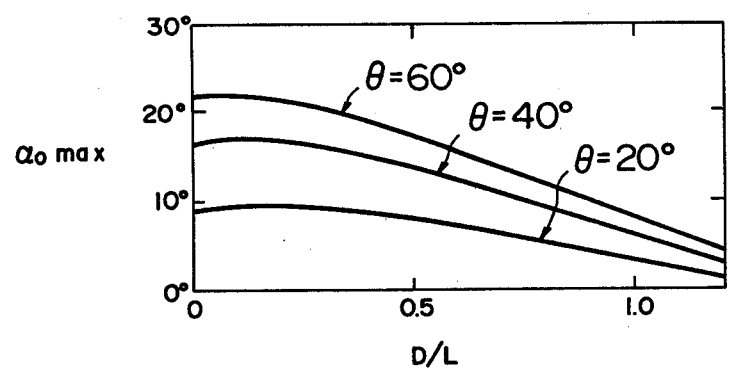
FIG. 15 is a graph showing relations between an orientation angle $\alpha_o$ $max$ for maximizing the flux density at the center of a gap and a dimensional ratio of a track width defining part.
Figure 16:
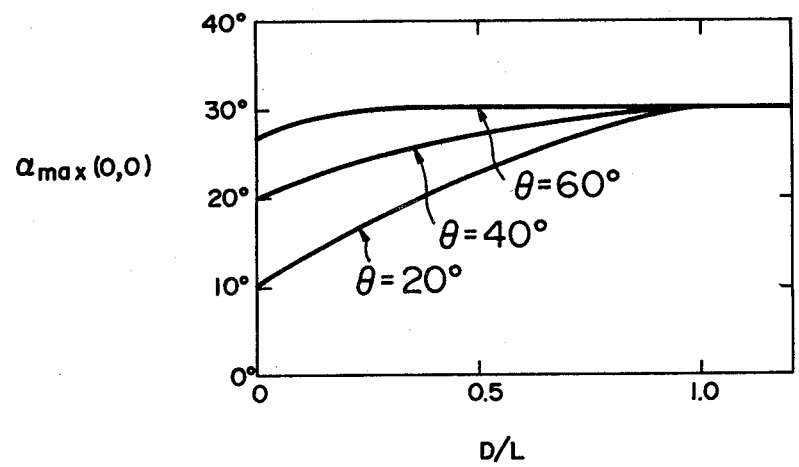
FIG. 16 is a graph showing relations between $\alpha_{max}$ (0, 0) and a dimensional ratio of a track width defining part.
Figure 17:
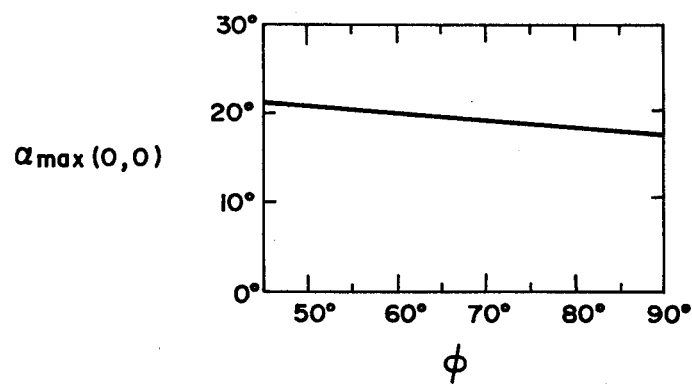
FIG. 17 is a graph showing a relation between $\alpha_{max}$ (0, 0) and an angle of inclination of the end of a track width defining part.
Figure 18:
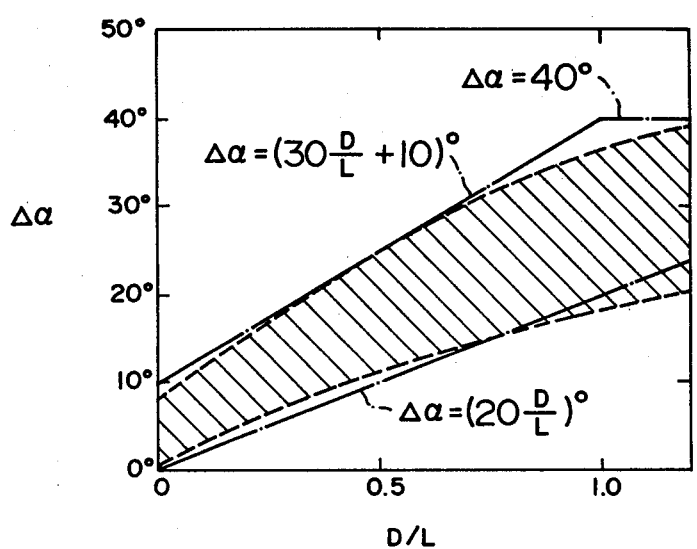
FIG. 18 is a graph showing a range of $\Delta\alpha$ in a magnetic head having a practical shape and dimension.
Figure 19:
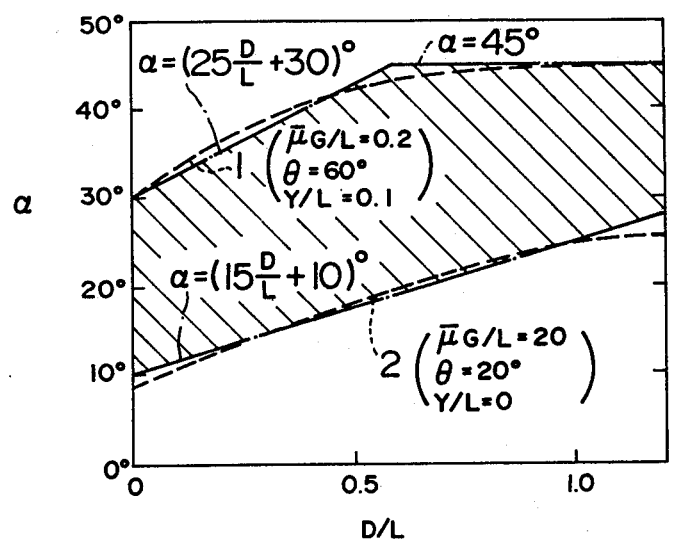
FIGS. 19, 20 and 21 are graphs showing ranges of $\alpha$ for giving the highest characteristic to a magnetic head having a practical shape, dimension and magnetic permeability.
Figure 20:
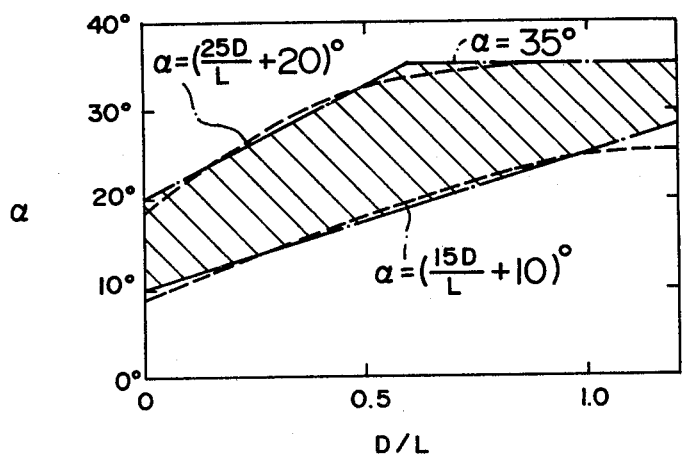
Figure 21:
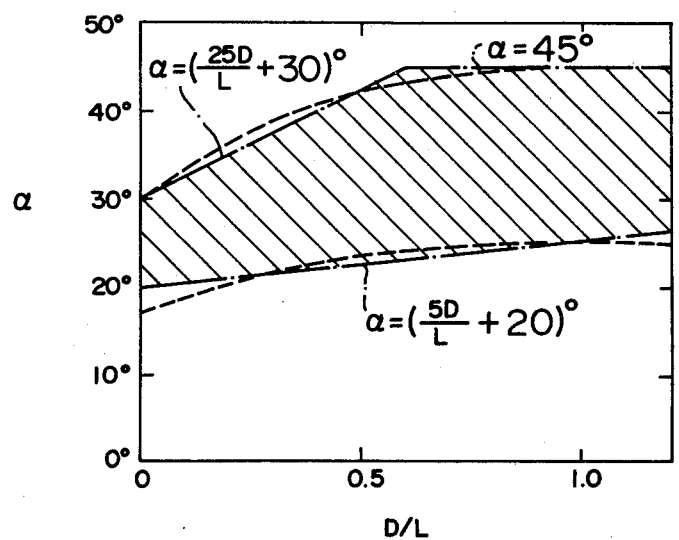
Figure 22:
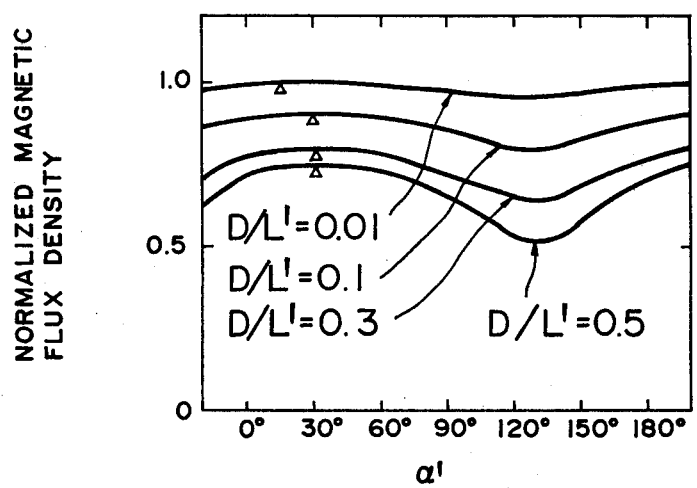
FIG. 22 is a graph showing relations between the flux density at a point (0, G) above a gap and an orientation angle $\alpha'$ of an axis of magnetic anisotropy in a track width defining part without a slant.
Figure 23:
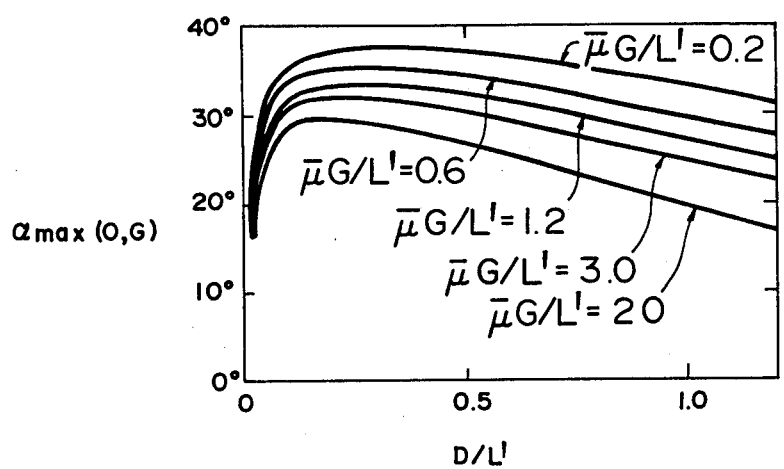
FIG. 23 is a graph showing relations between an orientation angle $\alpha'_{max}$ for maximizing the flux density at a point (0, G) and a ratio of a gap depth D to a length L' of a track width defining part without a slant.
Figure 24:
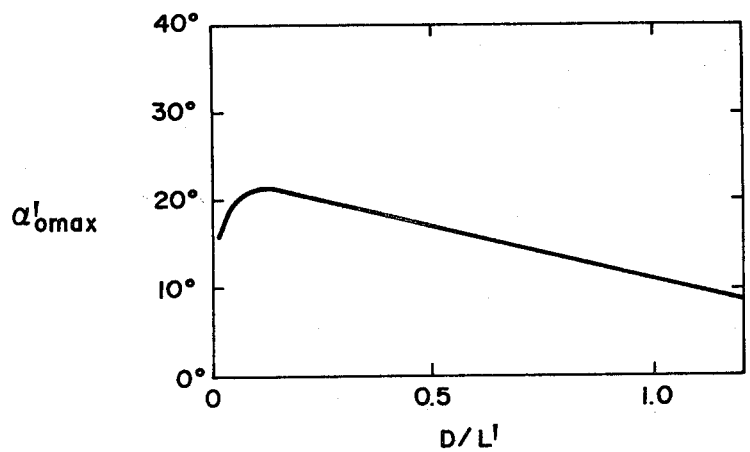
FIG. 24 is a graph showing a relation between an orientation angle $\alpha'_{o\ max}$ for maximizing the flux density at the center of a gap and the above-mentioned ratio D/L'.
Figure 25:
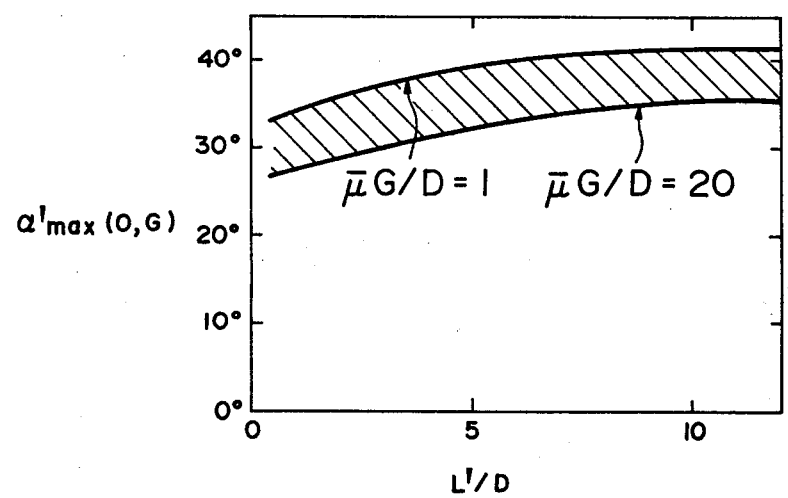
FIG. 25 is a graph showing a range of $\alpha'$ for giving the highest characteristic to a magnetic head having a practical shape, dimension and magnetic permeability.
Figure 26:
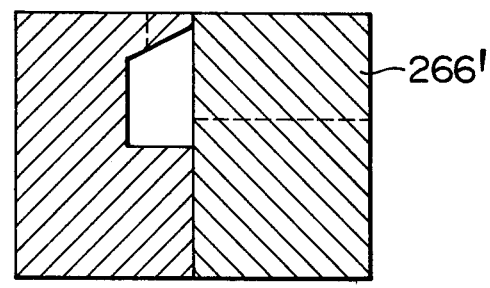
FIG. 26 is a sectional view showing an example of the core of a magnetic head, to which the present invention is applied.
Figure 29:
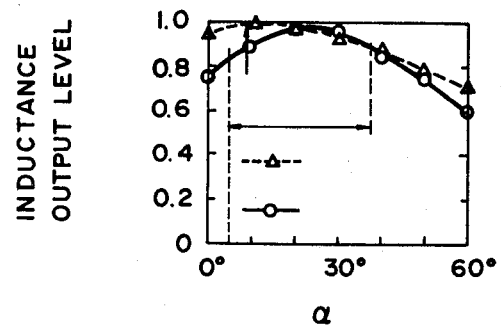
FIG. 29 is a graph showing the dependence of inductance and output level on $\alpha$ in a further embodiment of a magnetic head according to the present invention.
Figure 30:
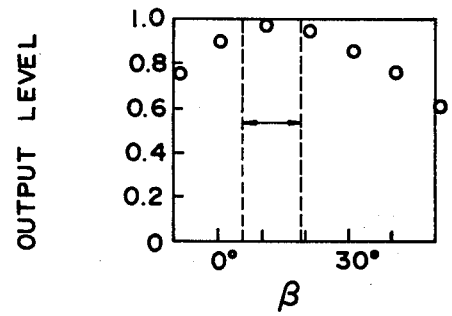
FIG. 30 is a graph showing a relation between output level and $\beta$ in the same embodiment as in FIG. 29.

A C-shaped core half with a window (such as indicated by reference numeral 78 in FIG. 7) and an I-shaped core half without a window (such as indicated by reference numeral 78' in FIG. 7) were made of orientated polycrystalline ferrite which contained about 50% $Fe_2O_3$, about 30% MnO and about 20% ZnO by the number of molecules and was orientated in the direction of a crystallographic axis $<111>$. The main magnetic circuit plane of each core half was formed of a plane including the axis $<111>$, and these core halves were bonded to form a magnetic head having the same form as the magnetic heads in EMBODIMENTS 1 and 2. A large number of magnetic heads were prepared which had the above-mentioned structure but were different from each other in each of the structural parameters L, D, G and $\theta$ and in the angle $\alpha$ between the direction of the above axis $<111>$ and a core surface confronting a magnetic recording medium. Further, in each of the magnetic heads, the track width was made equal to 30 $\mu$m, and the thickness of parts of the magnetic core other than the track width defining parts was made equal to 150 $\mu$m. The form and dimension of the I- shaped core half wear made equal to those of the I-shaped core half used in EMBODIMENTS 1 and 2. The characteristic of each of the magnetic heads thus formed was measured. The results of measurements made on magnetic heads, in which the parameters L, D, G, $\theta$ and $\phi$ were made equal to 100 μm, 30 μm, 0.5 μm, 20° and 70°, respectively, and the angle $\alpha$ had various values in a range from 0° to 60°, are shown in FIG. 29. In more detail, FIG. 29 shows a relation between the inductance of magnetic head and the angle $\alpha$, and a relation between the output of magnetic head obtained by recording a 2-MHz signal on an ordinary home video tape and reproducing the recorded signal, and the angle $\alpha$. The inductance and output level in FIG. 29 are normalized. Two dotted straight lines shown in FIG. 29 indicate angles (15 D/L)°, min [{(25 D/L)+30}°, 45°], respectively. When the angle $\alpha$ lies in a range bounded by these straight lines, the magnetic head can generate a high reproducing output. Further, in FIG. 29, a point having a maximum inductance is indicated by an arrow. An angle $\alpha$ for making maximum the inductance of magnetic head is considered to be an angle for making minimum the magnetic reluctance of the main magnetic circuit of magnetic head. Therefore, the dependence of output level on $\alpha$ can be regarded as the dependence of output level on $\beta$, when the value of $\alpha$ is expressed on the basis of an angle for making maximum the inductance of magnetic head. FIG. 30 shows the above-mentioned dependence of output level on $\beta$. It is evident from FIG. 30 that the magnetic head can generate an especially high reproducing output when the angle $\beta$ lies in a range bounded by two dotted straight lines, which indicate angles (20 D/L)° and min [{(30 D/L)+10}°, 40°], respectively.

Figure 31:
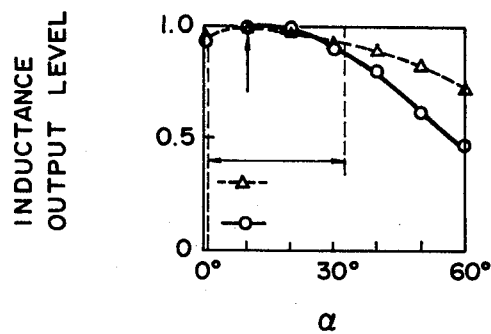
FIG. 31 is a graph showing the dependence of inductance and output level on $\alpha$ in still another embodiment of a magnetic head according to the present invention.
Figure 32:
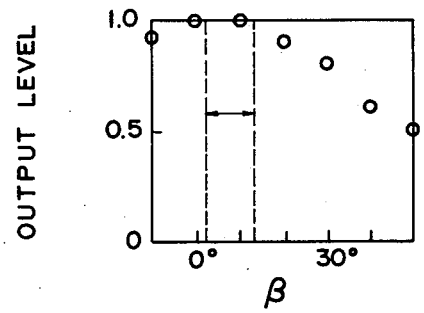
FIG. 32 is a graph showing a relation between output level and $\beta$ in the same embodiment as in FIG. 31.

Further, other magnetic heads were prepared, in which the parameters L, D, G and $\theta$ were made equal to 500 μm, 50 μm, 0.8 μm and 20°, respectively, and the angle $\alpha$ had various values in a range from 0° to 60°. FIG. 31 shows the inductance and reproducing output (for a 2-MHz signal) of these magnetic heads. FIG. 32 shows the dependence of output level on $\beta$ which is obtained in the above-mentioned manner. A range of angle between two dotted straight lines in each of FIGS. 31 and 32 has the same meaning as that in each of FIGS. 29 and 30. That is, it is evident that the magnetic head can have an excellent recording/reproducing characteristic when the angles $\alpha$ and $\beta$ lie in the range shown in FIG. 31 and the range shown in FIG. 32, respectively.

Figure 33:
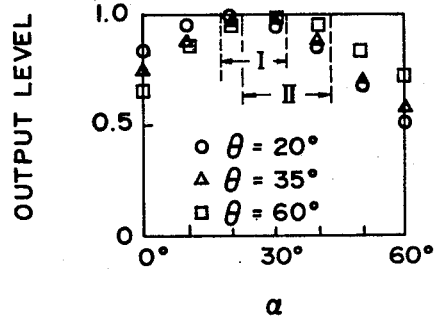
FIG. 33 is a graph showing relations between output level and $\alpha$ in still a further embodiment of a magnetic head according to the present invention.

Further, still other magnetic heads were prepared in which the parameters L, D and G were made equal to 200 μm, 100 μm and 1 μm, respectively, the value of $\theta$ was made equal to 20°, 35° and 60°, and the angle $\alpha$ had various values. FIG. 33 shows relations between output level and $\alpha$ of these magnetic heads. In FIG. 33, mark O indicates magnetic heads with $\theta$ equal to 20°, Δ magnetic heads with $\theta$ equal to 35°, and □ magnetic heads with $\theta$ equal to 60°. It is evident from FIG. 33 that the magnetic heads with $\theta$ equal to 20° and 35° can have an excellent recording/reproducing characteristic when the angle $\alpha$ lies in a first region I bounded by two dotted straight lines which indicate angles {(15 D/L)+10|° and min [{(25 D/L)+20}°, 35°], respectively, and that the magnetic heads with $\theta$ equal to 35° and 60° can have an excellent recording/reproducing characteristic when the angle $\alpha$ lies in a second region II bounded by two dotted straight lines which indicate angles {(5 D/L)+20}° and min [{(25 D/L)+30}°, 45°], respectively. Further, it was confirmed that the oriented polycrystalline ferrite in the present emmbodiment had a maximum magnetic permeability in the direction of the crystallographic axis <111> at a frequency of 2 MHz.

EMBODIMENT 4

Figure 34:
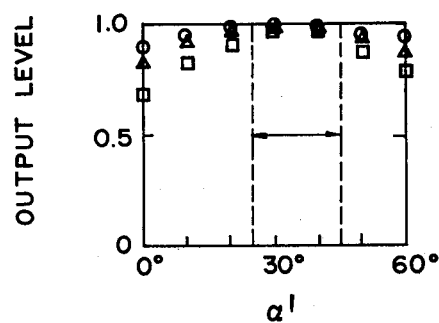
FIGS. 34 and 35 are graphs showing relations between output levels and $\alpha'$ in various embodiments of a magnetic head according to the present invention.

A large number of magnetic heads were prepared using the same monocrystalline ferrite and glass as in EMBODIMENT 1. In each of these magnetic heads, the main magnetic circuit plane was formed of a crystal plane (110). In these magnetic heads, an angle $\alpha$ in the C-shaped core half between a direction <110> in the above plane and a core surface confronting a magnetic recording material was made equal to 25°, a similar angle $\alpha'$ in the I-shaped core half had various values, the parameters L, D, G, $\theta$, $\phi$ and D' were made equal to 150 μm, 30 μm, 0.3 μm, 30°, 70° and 400 μm, respectively, and the parameter L' had three values 600 μm, 300 μm and 120 μm. The same measurement as in EMBODIMENT 1 was made on these magnetic heads. FIG. 34 shows relations between output level and $\alpha'$ of these magnetic heads. In FIG. 34, mark 0 indicates magnetic heads with L' equal to 600 μm, Δ magnetic heads with L' equal to 300 μm, □ magnetic heads with L' equal to 120 μm. As is evident from FIG. 34, in any case, the magnetic head can have an excellent recording/reproducing characteristic when the angle $\alpha'$ lies in a region bounded by two dotted straight lines, namely, in a range from 25° to 45°.

EMBODIMENT 5

Figure 35:
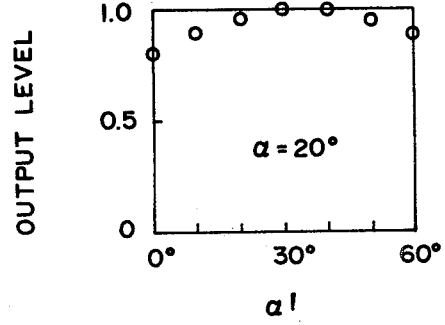

A large number of magnetic heads having the same form as in EMBODIMENT 3 were prepared using the oriented polycrystalline ferrite in EMBODIMENT 3. The main magnetic circuit plane of the C-shaped core half was formed of a crystal plane including a crystallographic axis <111>, and an angle $\alpha$ between the axis <111> and a core surface confronting a magnetic recording medium was made equal to 20°, at which a maximum output was obtained in EMBODIMENT 3. The main magnetic circuit plane of the I-shaped core half was also formed of a crystal plane including the axis <111>, and an angle $\alpha'$ between the axis <111> and a core surface confronting a magnetic recording medium was varied. The same measurement as in EMBODIMENT 3 was made on these magnetic heads. FIG. 35 shows a relation between normalized output level and $\alpha'$. It is apparent from FIG. 35 that the value of $\alpha$ for making the output level maximum is generally different from the value of $\alpha'$ for making the output level maximum.

We claim:

1. A magnetic head having a magnetic core formed by facing a pair of magnetic substances through a working gap at a head section confronting a magnetic recording medium, comprising an oblique part made by at least one of said magnetic substances in the neighborhood of said working gap for forming said working gap, an inner wall of said oblique part being inclined at an angle with a face confronting said magnetic recording medium, said oblique part being made of a magnetic material having magnetic anisotropy, an angle $\alpha$ between a direction having a maximum magnetic permeability in a main magnetic circuit plane of said oblique part and said face confronting said magnetic recording medium being larger than an orientation angle of said direction for making minimum a magnetic reluctance of a main magnetic circuit of said magnetic core by an angle $\beta$, said angle $\beta$ being given by the following formula:

$$\left(\frac{20D}{L^*} - 10\right)^\circ < \beta < \min\left[\left(\frac{30D}{L^*} + 20\right)^\circ, 50^\circ\right],$$

wherein D indicates a depth of said working gap, $L^*$, indicates an effective length of said oblique part, and min $$\left[\left(\frac{30D}{L^*} + 20\right)^\circ, 50^\circ\right]$$

indicates the smaller of $$\left(\frac{30D}{L^*} + 20\right)^\circ \text{ and } 50^\circ.$$

and 50°.

2. A magnetic head according to claim 1, wherein said angle $\beta$ is given by the following formula:

$$\left(\frac{20D}{L^*} - 5\right)^\circ < \beta < \min\left[\left(\frac{30D}{L^*} + 15\right)^\circ, 45^\circ\right].$$

3. A magnetic head according to claim 1, wherein said angle $\beta$ is given by the following formula:

$$\left(\frac{20D}{L^*}\right)^\circ < \beta < \min\left[\left(\frac{30D}{L^*} + 10\right)^\circ, 40^\circ\right].$$

4. A magnetic head according to claim 1, wherein said angle $\alpha$ lies within a range from 10° to 45°.

5. A magnetic head according to claim 1, wherein said angle $\alpha$ is given by the following formula:

$$\left(\frac{15D}{L^*}\right)^\circ < \alpha < \min\left[\left(\frac{25D}{L^*} + 40\right)^\circ, 45^\circ\right].$$

6. A magnetic head according to claim 1, wherein said angle $\alpha$ is given by the following formula:

$$\left(\frac{15D}{L^*} + 5\right)^\circ < \alpha < \min\left[\left(\frac{25D}{L^*} + 35\right)^\circ, 45^\circ\right].$$

7. A magnetic head according to claim 1, wherein said angle $\alpha$ is given by the following formula:

$$\left(\frac{15D}{L^*} + 10\right)^\circ < \alpha < \min\left[\left(\frac{25D}{L^*} + 30\right)^\circ, 45^\circ\right].$$

8. A magnetic head according to claim 1, wherein an angle $\theta$ between said inner wall of said oblique part and said face confronting said magnetic recording medium lies substantially within a range from 20° to 35°, and said angle $\alpha$ is given by the following formula:

$$\left(\frac{15D}{L^*}\right)^\circ < \alpha < \min\left[\left(\frac{25D}{L^*} + 30\right)^\circ, 45^\circ\right].$$

9. A magnetic head according to claim 8, wherein said angle $\alpha$ is given by the following formula:

$$\left(\frac{15D}{L^*} + 5\right)^\circ < \alpha < \min\left[\left(\frac{25D}{L^*} + 25\right)^\circ, 40^\circ\right].$$

10. A magnetic head according to claim 8, wherein said angle $\alpha$ is given by the following formula:

$$\left(\frac{15D}{L^*} + 10\right)^\circ < \alpha < \min\left[\left(\frac{25D}{L^*} + 20\right)^\circ, 35^\circ\right].$$

11. A magnetic head according to claim 1, wherein an angle $\theta$ between said inner wall of said oblique part and said face confronting said magnetic recording medium lies substantially within a range from 35° to 60°, and said angle $\alpha$ is given by the following formula:

$$\left(\frac{5D}{L^*} + 10\right)^\circ < \alpha < \min\left[\left(\frac{25D}{L^*} + 40\right)^\circ, 45^\circ\right].$$

12. A magnetic head according to claim 11, wherein said angle $\alpha$ is given by the following formula:

$$\left(\frac{5D}{L^*} + 15\right)^\circ < \alpha < \min\left[\left(\frac{25D}{L^*} + 35\right)^\circ, 45^\circ\right].$$

13. A magnetic head according to claim 11, wherein said angle $\alpha$ is given by the following formula:

$$\left(\frac{5D}{L^*} + 20\right)^\circ < \alpha < \min\left[\left(\frac{25D}{L^*} + 30\right)^\circ, 45^\circ\right].$$

14. A magnetic head having a magnetic core, comprising first and second magnetic substances facing each other through a working gap at a head section confronting a magnetic recording medium for forming said magnetic core, only said second magnetic substance having at a portion thereof near said working gap an oblique part for forming said working gap, an inner wall of said oblique part being inclined at an angle with a face confronting said magnetic recording medium, said first magnetic substance being a magnetic material having magnetic anisotropy, a side face of said first magnetic substance being opposite to said oblique part of said second magnetic substance through a nonmagnetic layer, an angle $\alpha'$ between a direction having a maximum magnetic permeability at a part of said first magnetic substance near said working gap in a main magnetic circuit plane of said magnetic core and said face confronting said magnetic recording medium being larger than an orientation angle of said direction for making minimum a magnetic reluctance of a main magnetic circuit of said magnetic core by about 25° or less.

15. A magnetic head according to claim 1, wherein only a second one of said magnetic substances has at a portion thereof near said working gap said oblique part for forming said working gap, said inner wall of said oblique part is inclined at an angle with said face confronting said magnetic recording medium, a first one of said magnetic substances is a magnetic material having magnetic anisotropy, a side face of said first magnetic substance is opposite to said oblique part of said second magnetic substance through a nonmagnetic layer, and an angle $\alpha'$ between a direction having a maximum magnetic permeability at a part of said first magnetic substance near said working gap in a main magnetic circuit plane of said magnetic core and said face confronting said magnetic recording medium is larger than an orientation angle of said direction for making minimum a magnetic reluctance of a main magnetic circuit of said magnetic core by about 25° or less.

16. A magnetic head according to claim 15, wherein said angle $\alpha'$ lies substantially within a range from 15° to 45°.

17. A magnetic head according to claim 16, wherein said part of said first magnetic substance near said working gap is made smaller in thickness than the remaining part of said first magnetic substance to form a track width defining part having a thickness substantially equal to a track width, a ratio of a depth D of said working gap to a length L' of said track width defining part is in a range from 0.05 to 0.25, and said angle $\alpha'$ between said direction having a maximum magnetic permeability at said track width defining part in said main magnetic circuit plane of said magnetic core and said face confronting said magnetic recording medium lies substantially within a range from 25° to 45°.

18. A magnetic head according to claim 16, wherein said angle $\alpha$ and said angle $\alpha'$ differ from each other.

19. A magnetic head according to any one of claims 1 through 18, wherein said magnetic material having magnetic anisotropy is monocrystalline Mn-Zn ferrite.

20. A magnetic head according to any one of claims 1 through 18, wherein said magnetic material having magnetic anisotropy is oriented polycrystalline ferrite.

21. A magnetic head according to any one of claims 1 through 18, wherein said magnetic material having magnetic anisotropy is a monocrystalline or oriented polycrystalline magnetic metal.

22. A magnetic head according to any one of claims 1 through 18, wherein at least one of a pair of track width defining parts is made of monocrystalline Mn—Zn ferrite having a positive magnetocrystalline anisotropy constant $K_1$, a main magnetic circuit plane of said track width defining part is substantially formed of a crystal plane (110), and a residual stress in said track width defining part is restricted or controlled so that a direction $<100>$ in said plane (110) is a direction having a maximum magnetic permeability in a low frequency range.

23. A magnetic head according to any one of claims 1 through 18, wherein at least one of a pair of track width defining parts is made of monocrystalline Mn—Zn ferrite having a positive magnetocrystalline anisotropy constant $K_1$, and a main magnetic circuit plane of said track width defining part is substantially formed of a crystal plane (110), and a residual stress in said track width defining part is restricted or controlled so that a direction $<110>$ in said plane (110) is a direction having a maximum magnetic permeability in a high frequency range.

24. A magnetic head according to any one of claims 1 through 18, wherein at least one of a pair of track width defining parts is made of monocrystalline Mn—Zn ferrite having a negative magnetostrictive constant $\lambda_{100}$, and a main magnetic circuit plane of said track width defining part is substantially formed of a crystal plane (110), and a residual stress in said track width defining part is restricted or controlled so that a direction $<100>$ in said plane (110) is a direction having a maximum magnetic permeability in a low frequency range.

25. A magnetic head according to any one of claims 1 through 18, wherein at least one of a pair of track width defining parts is made of monocrystalline Mn—Zn ferrite having a negative magnetostrictive constant $\lambda_{100}$ and a positive magnetostrictive constant $\lambda_{111}$, a main magnetic circuit plane of said track width defining part is substantially formed of a crystal plane (110), and a tension is made to remain in a side surface of said track width defining part parallel to said main magnetic circuit plane so that a direction $<100>$ in said plane (110) is a direction having a maximum magnetic permeability in a high frequency range.

26. A magnetic head according to any one of claims 1 through 18, wherein at least one of a pair of track width defining parts is made of monocrystalline Mn—Zn ferrite having a negative magnetostrictive constant $\lambda_{100}$ and a positive magnetostrictive constant $\lambda_{111}$, a main magnetic circuit plane of said track width defining part is substantially formed of a crystal plane (110), and a tension is made to remain in a side surface of said track width defining part parallel to said main magnetic circuit plane so that a direction $<110>$ in said plane (110) is a direction having a maximum magnetic permeability in a low frequency range.

27. A magnetic head according to any one of claims 1 through 18, wherein at least one of a pair of track width defining parts is made of monocrystalline Mn—Zn ferrite having a negative magnetocrystalline anisotropy constant $K_1$, a main magnetic circuit plane of said track width defining part is substantially formed of a plane including one crystallographic axis $<111>$, and a residual stress in said track width defining part is restricted so that the direction of said axis $<111>$ is a direction having a maximum magnetic permeability in a low frequency range.

28. A magnetic head according to any one of claims 1 through 18, wherein at least one of a pair of track width defining parts is made of monocrystalline Mn—Zn ferrite having a negative magnetocrystalline anisotropy constant $K_1$, a main magnetic circuit plane of said track width defining part is substantially formed of a plane including one crystallographic axis $<111>$, and a residual stress in said track width defining part is restricted so that a direction having a maximum magnetic permeability in a plane parallel to said main magnetic circuit plane in a high frequency range is a direction perpendicular to said axis $<111>$.

* * * * *